United States Patent
Kumar et al.

(10) Patent No.: US 10,620,964 B2
(45) Date of Patent: Apr. 14, 2020

(54) SYSTEM AND METHOD FOR SOFTWARE PLUG AND PLAY

(71) Applicant: Tata Consultancy Services Limited, Mumbai (IN)

(72) Inventors: Anand Kumar, Pune (IN); Kesav Vithal Nori, Hyderabad (IN)

(73) Assignee: Tata Consultancy Services Limited, Mumbai (IN)

(*) Notice: Subject to any disclaimer, the term of this patent is extended or adjusted under 35 U.S.C. 154(b) by 24 days.

(21) Appl. No.: 15/925,015

(22) Filed: Mar. 19, 2018

(65) Prior Publication Data
US 2018/0275999 A1  Sep. 27, 2018

(30) Foreign Application Priority Data
Mar. 21, 2017 (IN) .............................. 201721009913

(51) Int. Cl.
G06F 9/4401 (2018.01)
G06F 13/10 (2006.01)
G06F 8/36 (2018.01)
G06F 9/445 (2018.01)
G06F 13/38 (2006.01)
H04L 12/24 (2006.01)
G06F 8/20 (2018.01)

(52) U.S. Cl.
CPC .............. *G06F 9/4415* (2013.01); *G06F 8/36* (2013.01); *G06F 9/44526* (2013.01); *G06F 13/102* (2013.01); *G06F 13/385* (2013.01); *H04L 41/0809* (2013.01); *G06F 8/20* (2013.01)

(58) Field of Classification Search
CPC .............. G06F 9/4411; G06F 13/4068; G06F 19/3456; H05B 37/0245
See application file for complete search history.

(56) References Cited

U.S. PATENT DOCUMENTS

| | | | |
|---|---|---|---|
| 6,898,653 B2 | 5/2005 | Su et al. | |
| 2002/0023179 A1* | 2/2002 | Stanley | G06F 9/4411 710/8 |
| 2003/0093582 A1 | 5/2003 | Cruz et al. | |

(Continued)

OTHER PUBLICATIONS

Wang, S. et al. (2008). "Plug-and-Play Architectural Design and Verification," in *Computer Science*. Springer-Verlag Berlin Heidelberg; pp. 273-297.

*Primary Examiner* — Getente A Yimer
(74) *Attorney, Agent, or Firm* — Finnegan, Henderson, Farabow, Garrett & Dunner LLP (57) ABSTRACT

System and method for plug and play is an architectural framework and associated mechanisms for plug and playable components. Further the present disclosure facilitates discovery of plug and playable components in a host system without human intervention in configuration and utilization. To achieve this, the system is provided with: a collection of standards and protocols to support functional and structural extensibility of systems; and a collection of services and events to support functional and structural extensibility of systems. Further, the present disclosure facilitates instant connection and disconnection of external component into the host system. In addition, the system also facilitates instant operation and halt of the functionalities provided by the external system and the components plugged into the host system.

14 Claims, 8 Drawing Sheets

(56) References Cited

U.S. PATENT DOCUMENTS

| | | | |
|---|---|---|---|
| 2009/0234977 A1* | 9/2009 | Kale | G06F 13/4068 |
| | | | 710/13 |
| 2009/0327536 A1* | 12/2009 | Solomon | G06F 13/426 |
| | | | 710/63 |
| 2010/0114367 A1* | 5/2010 | Barrett | G06F 19/3456 |
| | | | 700/236 |
| 2011/0191503 A1* | 8/2011 | Kakish | G06F 13/10 |
| | | | 710/15 |
| 2012/0296447 A1* | 11/2012 | Diller | H05B 37/0245 |
| | | | 700/9 |

* cited by examiner

SYSTEM AND METHOD FOR SOFTWARE PLUG AND PLAY

PRIORITY CLAIM

This U.S. patent application claims priority under 35 U.S.C. § 119 to: India Application No. 201721009913, filed on Mar. 21, 2017. The entire contents of the aforementioned application are incorporated herein by reference.

TECHNICAL FIELD

The embodiments herein generally relates, in general, to digital computing and, in particular, to a system and method for plug and play.

BACKGROUND

Information systems have important strategic impact on global business including industrial sectors like retail, manufacturing, services, healthcare, insurance, telecom and government. Each information system in the industrial sectors house-keeps transactions internally, supports processes and hosts business decisions. Further, each industry provides a platform to enable other industries to integrate and coordinate business processes. Since the transactions and processes associated with each industry is different, there is a challenge in supporting change in environment. In order to support change in the environment, the industries constantly request for change in supporting infrastructure. The change can be effected either by at least one of (i) changing the configuration of the underlying components and the relationships among the components (ii) modifying existing components to cater to the change and (iii) building new components and establish interrelationships between the components in order to satisfy the change.

Conventionally, the change in the information system is effected by following a reverse engineering process till the causes for change in the information system are manifest, followed by a forward engineering process in order to produce the new information system that satisfies the changed requirements. Further, the old information system is brought down and the new system is put in its place and brought up so that the desired changes can be supported. It is evident that there is considerable business latency from the conception of change to its implementation. Such a situation is not desirable for businesses. Moreover, the information systems are statically composed at design time or the run-time composition is statically defined at design time and orchestrated at run-time. Hence there is a challenge in providing flexibility, extensibility and customer-centric services.

SUMMARY

Embodiments of the present disclosure present technological improvements as solutions to one or more of the above-mentioned technical problems recognized by the inventors in conventional systems. For example, in one embodiment, a method for plug and play is provided. The method includes identifying a set of characteristics associated with each external component to be plugged from a set of external components, wherein the set of characteristics associated with each external component comprising an identity, an interface, a set of capabilities, a set of services and a configuration by the one or more hardware processors. Further, the method includes connecting each external component to a component framework through a compatible socket by: (i) registering the interface associated with each external component from the set of external components (ii) attaching each component through the interface (iii) registering each external component with a component framework from a plurality of component frameworks (iv) registering the set of capabilities associated with each external component (v) registering the set of services associated with each external component (vi) allocating the set of resources to each external component and (vii) Configuring the set of external components, by the one or more hardware processors. Furthermore, the method includes invoking the set of capabilities associated with each external component by: (i) allocating a set of resources to each external component (ii) performing a plurality of tasks by each external component, wherein the plurality of tasks comprising a set of pre-defined actions (iii) releasing the set of resources associated with each external component after performing the plurality of tasks, by the one or more hardware processors. Furthermore, the method includes invoking, a set of services associated with the set of external components by: (i) allocating the set of resources to the set of external components (ii) performing the plurality of tasks to obtain a set of results, wherein the plurality of tasks comprising a set of pre-defined actions (iii) releasing the set of resources associated with the set of external components (iv) providing the set of results to the host computing machine and (v) utilizing the set of results by the host computing machine, by the one or more hardware processors. Furthermore, the method includes releasing, the set of external components by: (i) unplugging each external component from the plurality of component frameworks (ii) unregistering the set of services associated with the set of external components (iii) unregistering the set of capabilities associated with the set of external components (iv) unregistering the configuration associated with the set of external components (v) releasing the set of resources associated with the set of external components (vi) unregistering the set of interfaces associated with the set of external components and (vii) unregistering the set of external components, by the one or more hardware processors.

In another aspect, an architecture for plug and play associated with a host system is provided. The architecture includes a plurality of plugs comprising a set of plug capabilities, a set of plug services and a set of plug events to enable execution by a set of external components, a plurality of component frameworks comprising a set of elements for executing the set of external components, wherein the set of elements comprising a set of internal components, a set of resources, a set of internal capabilities, a set of internal services and a set of internal events available to each external component through a plurality of compatible sockets, the plurality of compatible sockets comprising a set of socket capabilities, a set of socket services and a set of socket events to enable the set of external components to utilize the set of elements associated with the plurality of component frameworks through a set of compatible interfaces and a plurality of channels to enable communication between the plurality of component frameworks and the set of external component plugged in at operation time, wherein the external component extends and adds functionality to the plurality of component frameworks.

In yet another aspect, a computer program product comprising a non-transitory computer-readable medium having embodied therein a computer program for system and method for plug and play, is provided. The computer readable program, when executed on a computing device, causes the computing device to identify, a set of characteristics associated with each external component to be plugged from a set of external components, wherein the set of characteristics associated with each external component comprising an identity, an interface, a set of capabilities, a set of services and a configuration. Further, the computer readable program, when executed on a computing device, causes the computing device to connect, each external component to a component framework through a compatible socket by: (i) registering the interface associated with each external component from the set of external components (ii) attaching each component through the interface (iii) registering each external component with a component framework from a plurality of component frameworks (iv) registering the set of capabilities associated with each external component (v) registering the set of services associated with each external component (vi) allocating the set of resources to each external component and (vii) configuring the set of external components. Furthermore, the computer readable program, when executed on a computing device, causes the computing device to invoke, the set of capabilities associated with each external component by: (i) allocating a set of resources to each external component (ii) performing a plurality of tasks by each external component, wherein the plurality of tasks comprising a set of pre-defined actions (iii) releasing the set of resources associated with each external component after performing the plurality of tasks. Furthermore, the computer readable program, when executed on a computing device, causes the computing device to invoke, a set of services associated with the set of external components by: (i) allocating the set of resources to the set of external components (ii) performing the plurality of tasks to obtain a set of results, wherein the plurality of tasks comprising a set of pre-defined actions (iii) releasing the set of resources associated with the set of external components (iv) providing the set of results to the host computing machine and (v) utilizing the set of results by the host computing machine. Furthermore, the computer readable program, when executed on a computing device, causes the computing device to release, the set of external components by: (i) unplugging each external component from the plurality of component frameworks (ii) unregistering the set of services associated with the set of external components (iii) unregistering the set of capabilities associated with the set of external components (iv) unregistering the configuration associated with the set of external components (v) releasing the set of resources associated with the set of external components (vi) unregistering the set of interfaces associated with the set of external components and (vii) unregistering the set of external components.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter overcomes the limitations of the conventional plug and play mechanisms by enabling dynamic composition of components at run-time thereby improving the flexibility, extensibility and customer-centricity of a host system. Here, the components are put together and realized dynamically when the components are plugged into the host system. Additionally, the present disclosure utilizes a plug and socket mechanism and associated architectural constructs for supporting the plug and play mechanism. An implementation of the system and method for plug and play is described further in detail with reference to FIGS. 1 through 6.

Referring now to the drawings, and more particularly to FIGS. 1 through 6, where similar reference characteristics denote corresponding features consistently throughout the figures, there are shown preferred embodiments and these embodiments are described in the context of the following exemplary system and/or method.

Figure 1A:
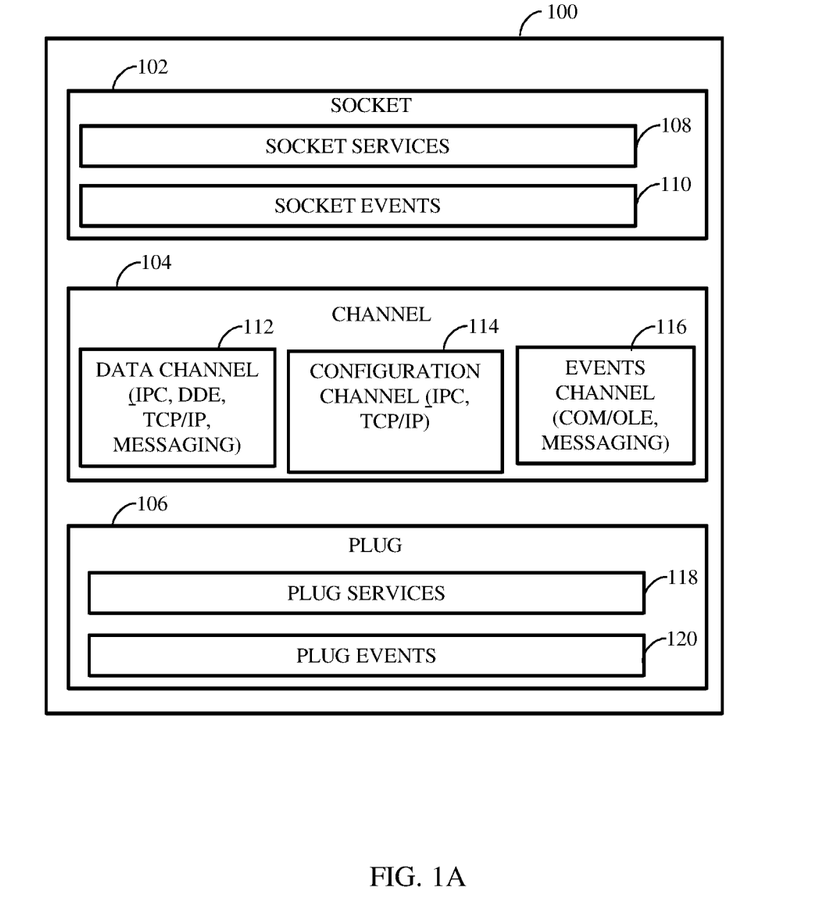
FIG. 1A illustrates an architecture framework for a system and method for plug and play, according to some embodiments of the present disclosure.

The system 100 includes a plurality of compatible sockets 102, a plurality of channels 104, a plurality of plugs 106, a plurality of component frameworks (not shown in FIG. 1A) and a plurality of run times associated with the plurality of component frameworks (not shown in FIG. 1A). The plurality of component frameworks comprising a set of elements for executing the set of external components. Here, the set of elements includes a set of internal components, a set of resources, a set of internal capabilities, a set of internal services and a set of internal events available to each external component through the plurality of compatible sockets 112. The plurality of compatible sockets 102 includes a set of socket services 108, a set of socket events 110 and a set of socket capabilities (not shown in FIG. 1A). The plurality of channels 104 includes a data channel 112, a configuration channel 114 and an events channel 116. The plurality of plugs 106 includes a set of plug services 118, a set of plug events 120 and a set of plug capabilities (not shown in FIG. 1A). The plurality of run times includes a set of capabilities, a set of services and a set of events to enable binding of at least one of the plurality of component frameworks, the plurality of plugs 106 and the plurality of sockets 102 to an operating system associated with the host system. FIG. 1A illustrates the architecture framework for the plug and play system 100, according to some embodiments of the present disclosure.

Referring now to FIG. 1A, the plurality of plugs 106 includes the set of plug capabilities (not shown in FIG. 1A), the set of plug services 118 and the set of plug events 120 to enable execution by a set of external components. The plurality of compatible sockets includes the set of socket capabilities (not shown in FIG. 1A), the set of socket services 108 and the set of socket events to enable the set of external components to utilize the set of elements associated with the plurality of component frameworks through a set of compatible interfaces. The plurality of channels 104 enables communication between the plurality of component frameworks and the set of external components plugged in at operation time. The plurality of channels 104 includes a plurality of data channels 112, a plurality of configuration channels 114 and a plurality of event channels 116. The plurality of event channels 116 provides pathways for a plurality of actions, wherein the plurality of actions includes listening, eventing and dispatching a set of events between the plurality of component frameworks and the set of external components. The plurality of configuration channels 114 provides pathway for modifying one or more configurations associated with the set of external components. The plurality of data channel 112 provides pathways for exchanging information between the plurality of component frameworks and the set of external components. Here, the external component extends and adds functionality to the plurality of component frameworks.

Figure 1B:
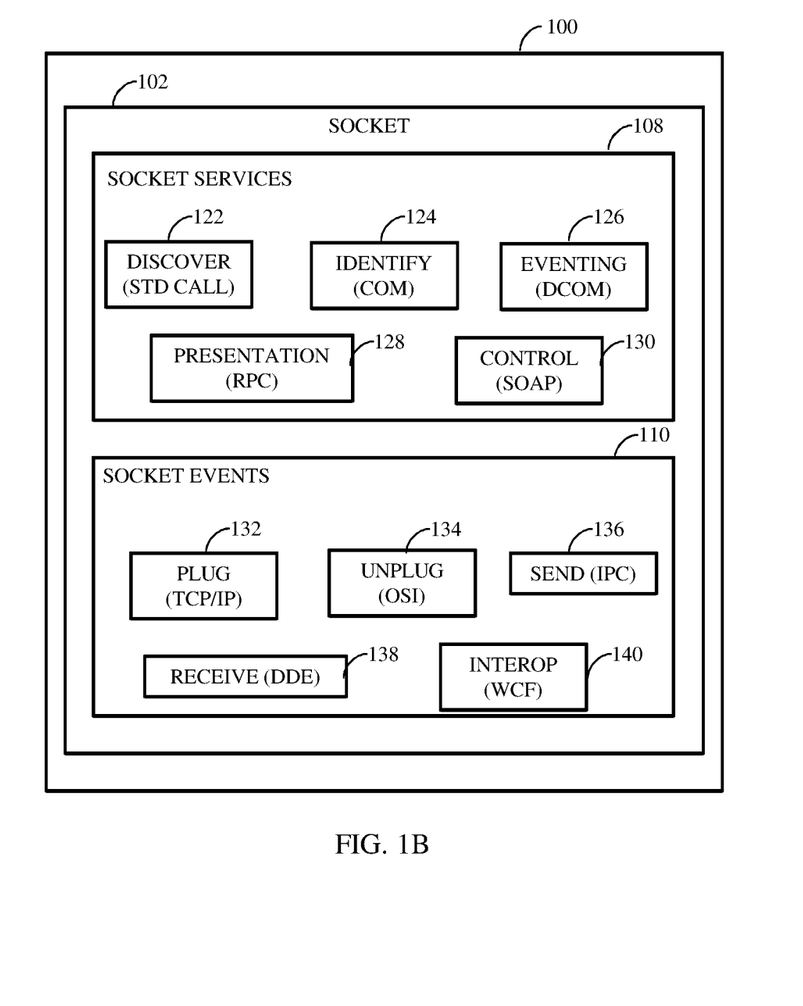
FIG. 1B illustrates a block diagram of a socket view for the plug and play system 100, according to some embodiments of the present disclosure.

FIG. 1B illustrates an example block diagram of a socket view for the plug and play system 100, according to some embodiments of the present disclosure. Referring now to FIG. 1B, the plurality of compatible sockets 102 includes the set of socket capabilities, the set of socket services and the set of socket events to enable the set of external components to utilize the set of elements associated with the plurality of component frameworks through the set of compatible interfaces. In an embodiment, the plurality of compatible sockets 102 is a handle to allow the set of plugged components to utilize a set of resources made available by the plurality of component frameworks. The plurality of compatible sockets 102 can handle one or more plug that satisfies the interface requirements of the socket. Further, the plurality of compatible sockets 102 serves as an integration mechanism for integrating the set of external components. The set of external components sends configuration information to the plurality of compatible plugs 102 using the plurality of configuration Channels 114 (refer FIG. 1A) and is further used to update the one or more configurations associated with the set of external components. Further, the plurality of compatible sockets 102 utilizes the information exchange services provided by the plurality of data channels 112 (refer FIG. 1A) to share data between the plurality of component frameworks and the set of external components. Further, the plurality of sockets 102 listens to and dispatches events using the plurality of event channels 116 (refer FIG. 1A) triggered by the host system to appropriate handlers.

In an embodiment, the plurality of compatible sockets 102 serves as the gateway to the plurality of component frameworks, for accessing the set of resources provided by the set of plugged components. Here, each socket can support zero or more plugged components. Further, the plurality of compatible sockets 102 encodes an interface mechanism for connecting to the plurality of plugs 106 and performs type checking to validate the compatibility of the plug. The plurality of sockets 102 can be implemented as part of the run-time support of the plurality of component frameworks or it can be implemented as a separate component. Further, the plurality of compatible sockets 102 includes the set of socket services 108 and the set of socket events 110. Here, the set of socket services 108 includes a discover socket service (socket__service__discover) 122, an identify socket service (socket__service__identify) 124, an eventing socket service (socket__service__eventing) 126, a presentation socket service (socket_service_presentation) 128 and a control socket service (socket_service_control) 130. In an embodiment, the discover socket service 122 utilizes standard call to attach dynamic libraries, the identify socket service 124 utilizes Component Object Model (COM) to plugin compatible components, the eventing socket service 126 utilizes Distributed Component Object Model (DCOM) to plugin a set of distributed compatible components, the presentation socket service 128 utilizes Remote Procedure Call (RPC) to attach to processes in external machines and the control socket service 130 utilizes Simple Object Access Protocol (SOAP) to exchange messages. Further, the set of socket events 110 includes a plug socket event (socket_event_plug) 132, an unplug socket event (socket_event_unplug) 134, a send socket event (socket_event_send) 136, a receive socket event (socket_event_receive) 138 and an interop socket event (socket_event_interop) 140. In an embodiment, the plug socket event 132 utilizes Transmission Control Protocol/Internet Protocol (TCP/IP) to communicate between the set of components, the unplug socket event 134 utilizes Open System Interconnection (OSI) protocol to deal with networking of the set of components and the plurality of events associated with the set of components, the send socket event 136 utilizes Inter Process Communication (IPC) protocol to communicate between components based on different technologies, the receive socket event 138 utilizes Dynamic Data Exchange (DDE) protocol to communicate different types of information and the interop socket event 140 utilizes Windows Communication Foundation (WCF) protocol to utilize capabilities provided by service components.

Figure 1C:
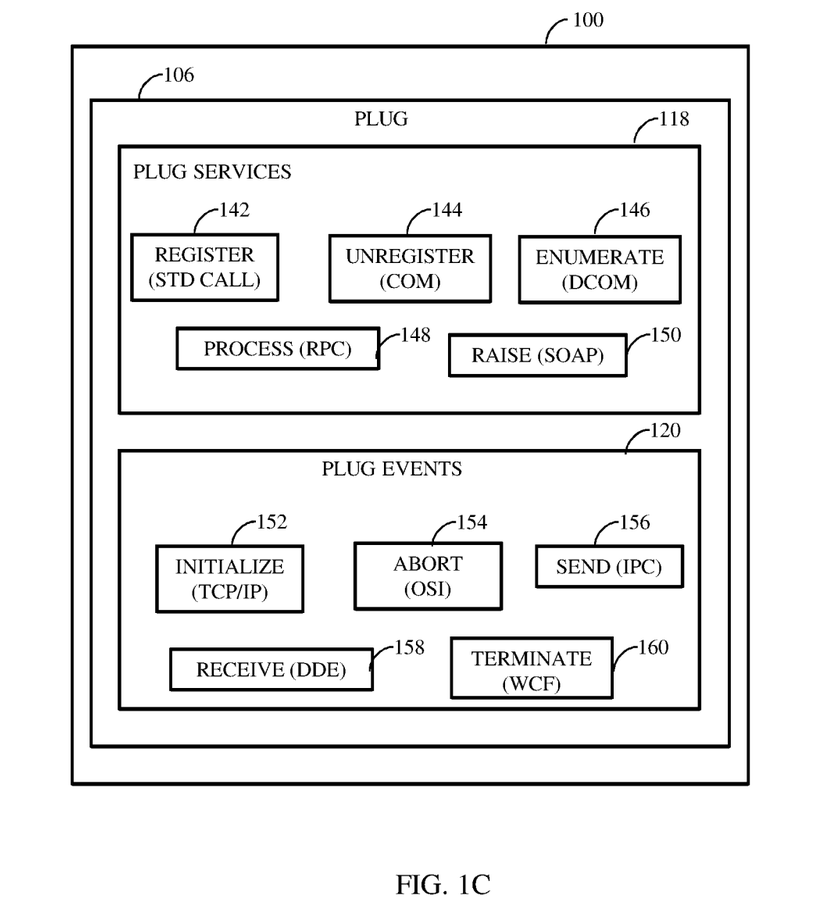
FIG. 1C illustrates a block diagram of a plug view for the plug and play system 100, according to some embodiments of the present disclosure.

FIG. 1C illustrates an example block diagram of a plug view for the plug and play system 100, according to some embodiments of the present disclosure. Referring now to FIG. 1C, the plurality of plugs 106 provides the set of plug capabilities (not shown in FIG. 1C), the set of plug services 118 and the set of plug events 120 to enable execution by the set of external components. Here, the plurality of plugs 106 enables the execution of the set of external components by (i) utilizing a plurality of resources allocated to the set of external components by the plurality of component frameworks and (ii) utilizing the set of compatible interfaces for connecting the set of external components to the plurality of compatible sockets. The plurality of plugs 106 utilizes a set of user preferences to control a behavior associated with the set of external component by utilizing the plurality of configuration channels 114 (refer FIG. 1A). Further, the plurality of plugs 106 utilizes the plurality of data channels 112 to exchange information between the set of external components and the plurality of component frameworks. Further, the plurality of plugs 106 listens to and dispatches events triggered by the host system to appropriate event handlers by utilizing the plurality of event channels 116 (refer FIG. 1A). Further, the plurality of plugs 106 includes the set of plug services 118 and the set of plug events 120. Here, the set of plug services 118 includes a register plug service (plug_service_register) 142, an unregister plug service (plug_service_unregister) 144, an enumerate plug service (plug_service_enumerate) 146, a process plug service (plug_service_process) 148 and a raise plug service (plug_service_raise) 150. In an embodiment, the register plug service 142 utilizes standard call to provide or consume the plurality of services, the unregister plug service 144 utilizes Component Object Model (COM) to plugin the set of components offering the plurality of services, the enumerate plug service 146 utilizes Distributed Component Object Model (DCOM) to plugin the set of components from other computing devices offering the plurality of services, the process plug service 148 utilizes Remote Procedure Call (RPC) to utilize the plurality of services provided by machines in a network and the raise plug service 150 utilizes Simple Object Access Protocol (SOAP) to exchange messages between the plurality of services. Further, the set of plug events 120 includes an initialize plug event (plug_event_initialize) 152, an abort plug event (socket_event_abort) 154, a send plug event (socket_event_send) 156, a receive plug event (socket_event_receive) 158 and a terminate plug event (socket_event_terminate) 160. In an embodiment, the initialize plug event 152 utilizes Transmission Control Protocol/Internet Protocol (TCP/IP) to provide communication between the set of components, the abort plug event 154 utilizes Open System Interconnection (OSI) protocol to establish networking of the plurality of services, the send plug event 156 utilizes Inter Process Communication (IPC) protocol to communicate between the plurality services based on different technologies, the receive plug event 158 utilizes Dynamic Data Exchange (DDE) protocol to remotely control the plurality of services and the terminate plug event 160 utilizes Windows Communication Foundation (WCF) protocol to facilitate orientation of the plurality of services.

Figure 2:
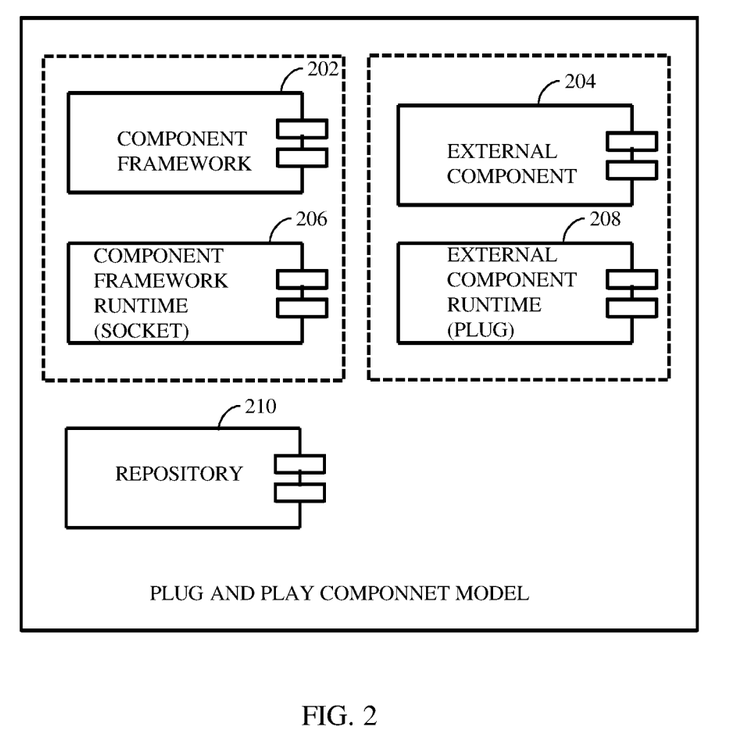
FIG. 2 illustrates a block diagram of component model for the plug and play system 100, according to some embodiments of the present disclosure.

FIG. 2 illustrates an example block diagram of component model for the plug and play system 100, according to some embodiments of the present disclosure. Referring now to FIG. 2, the plug and play component model includes a component framework 202, an external component 204, a component framework runtime 206, an external component runtime 208 and a repository 210. In an embodiment, the external component 204 extends and adds functionality to the component framework 202 thereby enabling the evolution of the underlying system. In an embodiment, the repository 210 can be used as a storage management system for tracking the various services, the various plugs, the various sockets, the various interfaces, the various components and the various component frameworks. The external component 204 utilizes the set of services provided by the plug 208 to attach itself, as a plugged component to the component framework 206. The plugged component utilizes the set of resources provided by the component framework 202 and provides resources for utilization by the component framework 202. The plugged component is designed to operate locally within its state space. For any additional requirements, the plugged component utilizes the resources provided by the component framework 202.

Figure 3:
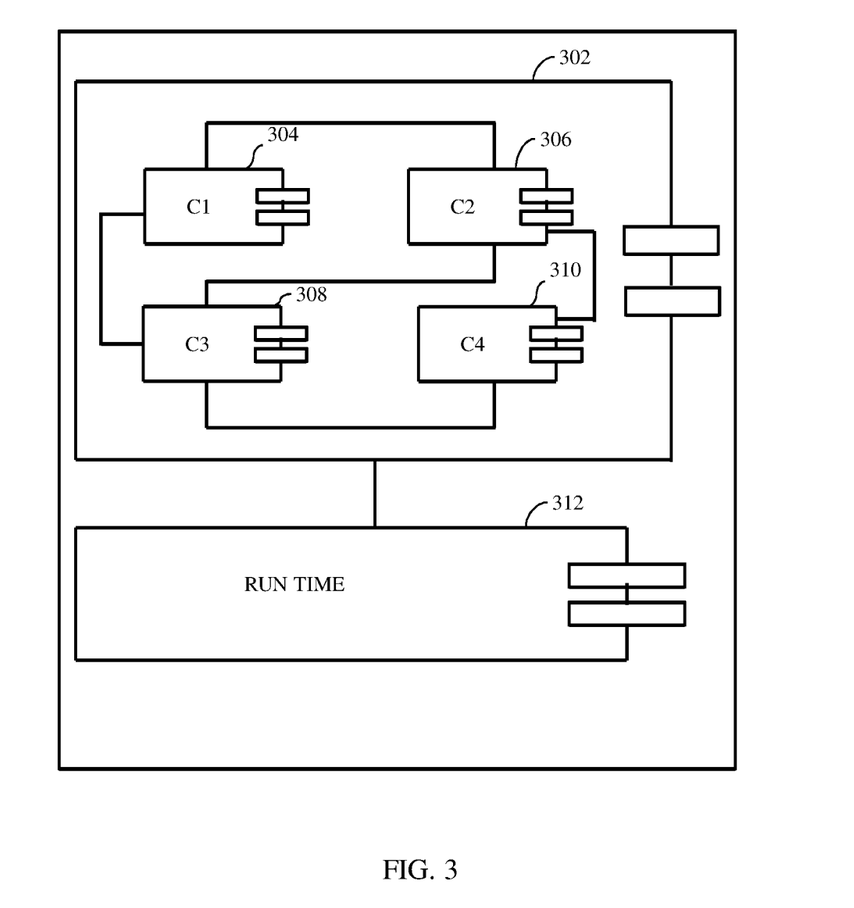
FIG. 3 illustrates a block diagram of components and run time of the plug and play system 100, according to some embodiments of the present disclosure.

FIG. 3 illustrates an example block diagram of components and run time of the plug and play system 100, according to some embodiments of the present disclosure. Referring now to FIG. 3, the component model 302 includes the plurality of components 304 (C1), 306 (C2), 308 (C3) and 310 (C4). The plurality of components can interop and request for services using protocols at run-time from the Run-Time component 312. Here, the run time component 312 includes a set of capabilities, a set of services and a set of events to enable binding of at least one of the plurality of component frameworks, the plurality of plugs and the plurality of sockets to an operating system associated with the host system. In an embodiment, the protocols are TCP/IP, OSI, IPC, DDE and WCF. In an embodiment, the standards utilized includes a standard call, COM, DCOM, RPC and SOAP. The component model comprises of four different components (C1 to C4) and the associated run-time component. For simplicity to explain, component diagrams are used to express the model and to understand the overall structure. For the sake of simplicity, the different component interfaces are not included in the illustration. However, the relationships between the components are illustrated.

Figure 4:
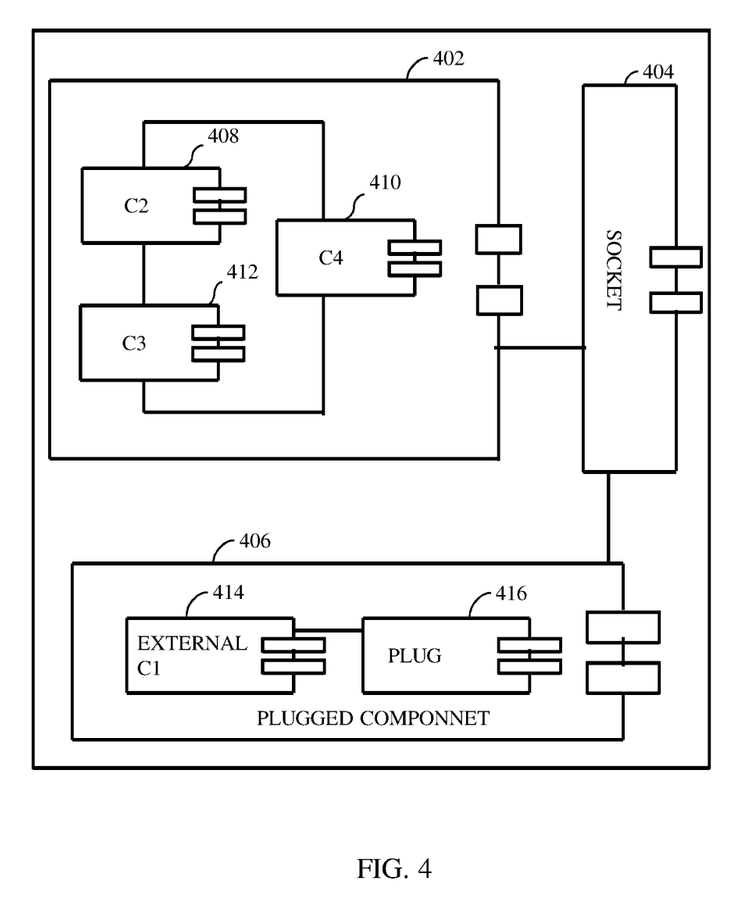
FIG. 4 illustrates a block diagram of components and interaction of components with the component framework through plug and socket for the plug and play system 100, according to some embodiments of the present disclosure.

FIG. 4 illustrates an example block diagram of components and interaction of components with the component framework through plug and socket for the plug and play system 100, according to some embodiments of the present disclosure. Referring now to FIG. 4, an external component C1 represented as 414 can plug with the plug 416 to form a plugged component 406 and the plugged component 406 can interop with a set of internal components 402. Here, the set of internal components 402 includes C2 represented as 408, C3 represented as 412, C4 represented as 410. Here, the plugged component 406 can interop with the set of internal components 402 through a socket represented as 404.

In an embodiment, the plug and play system 100 is configured to identify a set of characteristics associated with each external component to be plugged from a set of external components, wherein the set of characteristics associated with each external component includes an identity, an interface, a set of capabilities, a set of services and a configuration;

In an embodiment, the plug and play system 100 is configured to connect each external component to a component framework through the plurality of compatible sockets 102 by: (i) Registering the interface associated with each external component from the set of external components (ii) Attaching each component through the interface (iii) Registering each external component with a component framework from the plurality of component frameworks (iv) Registering the set of capabilities associated with each external component (v) Registering the set of services associated with each external component (vi) Allocating the set of resources to each external component and (vii) Configuring the set of external components.

In an embodiment, the plug and play system 100 is configured to invoke the set of capabilities associated with each external component by: (i) allocating a set of resources to each external component (ii) Performing a plurality of tasks by each external component, wherein the plurality of tasks comprising a set of pre-defined actions (iii) Releasing the set of resources associated with each external component after performing the plurality of tasks.

In an embodiment, the plug and play system 100 is configured to invoke a set of services associated with the set of external components by: (i) allocating the set of resources to the set of external components (ii) performing the plurality of tasks to obtain a set of results, wherein the plurality of tasks comprising a set of pre-defined actions (iii) releasing the set of resources associated with the set of external components (iv) providing the set of results to the host computing machine and (v) utilizing the set of results by the host computing machine.

In an embodiment, the plug and play system 100 is configured to release, the set of external components by: (i) unplugging each external component from the plurality of component frameworks (ii) unregistering the set of services associated with the set of external components (iii) unregistering the set of capabilities associated with the set of external components (iv) unregistering the configuration associated with the set of external components (v) releasing the set of resources associated with the set of external components (vi) unregistering the set of interfaces associated with the set of external components and (vii) unregistering the set of external components.

In an embodiment, an event is an encapsulated set of actions, triggered during the utilization of the computing resources when certain pre-defined conditions are met. Generally, certain events are triggered inside the plugged components and are handled locally. Certain other events are dispatched to the plurality of component frameworks for resolution. Similarly, certain events, triggered inside the plurality of component frameworks and are relevant to the plugged components are dispatched to the plurality of component frameworks and the rest is dispatched to its constituent components. In some embodiments, the event information is supplemented with additional event data thereby enabling better resolution of the event.

In an embodiment, a service is an encapsulated set of functionalities offered by a component, along with a set of policies of usage that declare the information necessary for the successful execution of the service. The set of functionalities are invoked by other components for different purposes. The service needs to be first discovered and further invoked using appropriate mechanism. Generally, certain services offered by the plugged components are consumed by the plurality of component frameworks and certain other services offered by the plurality of component frameworks are consumed by the plugged external components.

In an embodiment, information acts as a fundamental entity and is often considered as data that is processed, stored and transmitted by computing systems. The plurality of plugs and the plurality of compatible sockets serve as information pathways for exchanging different types of information between the plugged components and the plurality of component frameworks.

Figure 5:
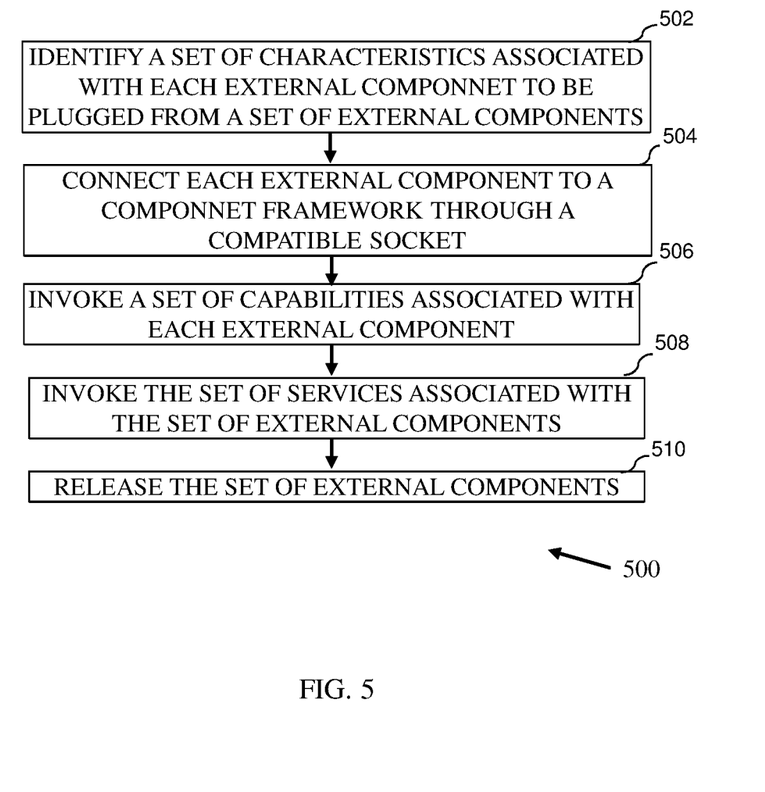
FIG. 5 illustrates an example flow diagram for plug and play system 100, according to some embodiments of the present disclosure.

FIG. 5 illustrates an example flow diagram for plug and play method 500, according to some embodiments of the present disclosure. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communication network. The order in which the method 500 is described is not intended to be construed as a limitation, and any number of the described method blocks can be combined in any order to implement the method 500, or an alternative method. Furthermore, the method 500 can be implemented in any suitable hardware, software, firmware, or combination thereof.

At 502, the method 500 identifies, by the one or more hardware processors, a set of characteristics associated with each external component to be plugged from the set of external components, wherein the set of characteristics associated with each external component including an identity, an interface, a set of capabilities, a set of services and a configuration. At 504, the method 500 connects, by the one or more hardware processors, each external component to the plurality of component frameworks through the plurality of compatible sockets by: (i) Registering the interface associated with each external component from the set of external components (ii) Attaching each component through the interface (iii) Registering each external component with a component framework from a plurality of component frameworks (iv) Registering the set of capabilities associated with each external component (v) Registering the set of services associated with each external component (vi) Allocating the set of resources to each external component and (vii) Configuring the set of external components. At 506, the method 500 invokes, by the one or more hardware processors, the set of capabilities associated with each external component by: (i) allocating a set of resources to each external component (ii) Performing the plurality of tasks by each external component, wherein the plurality of tasks including the set of pre-defined actions (iii) Releasing the set of resources associated with each external component after performing the plurality of tasks. At 508, the method 500 invokes, by the one or more hardware processors, the set of services associated with the set of external components by: (i) allocating the set of resources to the set of external components (ii) performing the plurality of tasks to obtain the set of results, wherein the plurality of tasks including a set of pre-defined actions (iii) releasing the set of resources associated with the set of external components (iv) providing the set of results to the host computing machine and (v) utilizing the set of results by the host computing machine. At 510, the method 500 releases, by the one or more hardware processors, the set of external components by: (i) unplugging each external component from the plurality of component frameworks (ii) unregistering the set of services associated with the set of external components (iii) unregistering the set of capabilities associated with the set of external components (iv) unregistering the configuration associated with the set of external components (v) releasing the set of resources associated with the set of external components (vi) unregistering the set of interfaces associated with the set of external components and (vii) unregistering the set of external components.

Figure 6:
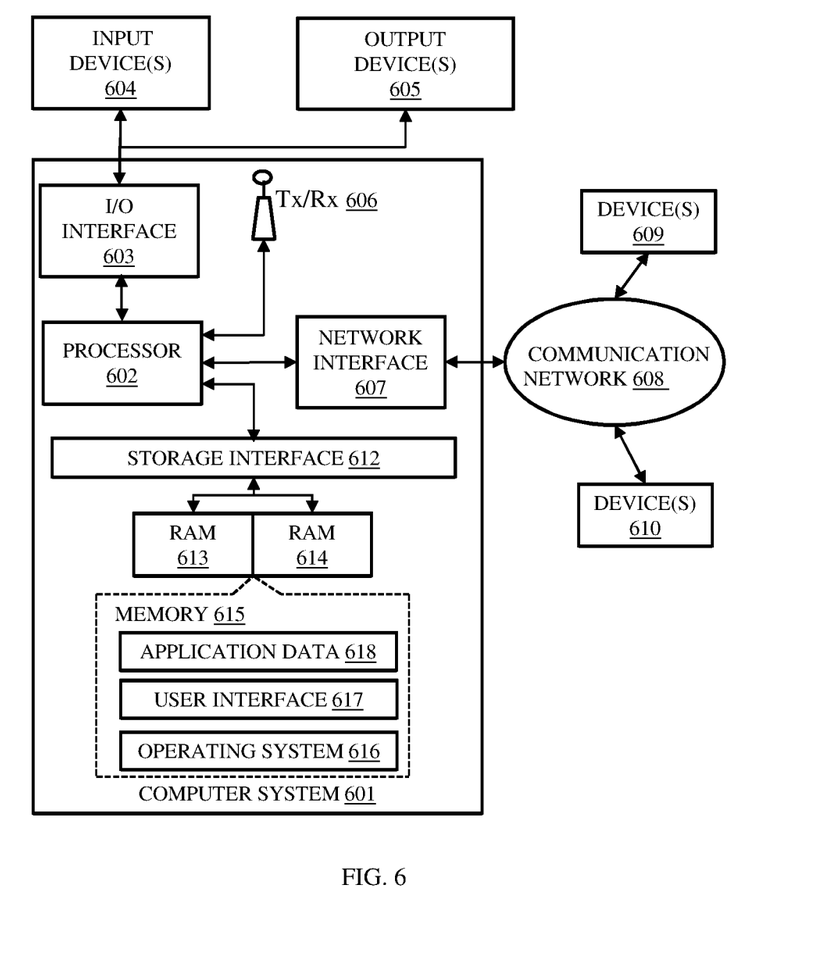
FIG. 6 illustrates a block diagram of an exemplary host system for implementing embodiments consistent with the present disclosure.

FIG. 6 is a block diagram of an exemplary host system 601 for implementing embodiments consistent with the present disclosure. The computer system 601 may be implemented in alone or in combination of components of the system 100 (refer, FIG. 1A). Variations of computer system 601 may be used for implementing the devices included in this disclosure. Computer system 601 may comprise a central processing unit ("CPU" or "processor") 602. Processor 602 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 602 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609 and 610. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 616, user interface application 617, user/application data 618 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 601 may store user/application data 618, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed methods and system for plug and play are able to provide a generic component model and associated architectural constructs for supporting plug and play architectures. Further, the present disclosure provides an underlying mechanism for supporting plug and play architecture by means of the plug and socket architectural constructs. Additionally, the present disclosure provides a language agnostic component model to enable plug and play for a plurality of programming languages and a plurality of technology platforms.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. An architecture for plug and play associated with a host system, the architecture comprising:
   a plurality of plugs comprising a set of plug capabilities, a set of plug services and a set of plug events to enable execution by a set of external components;
   a plurality of component frameworks comprising a set of elements for executing the set of external components, wherein the set of elements comprising a set of internal components, a set of resources, a set of internal capabilities, a set of internal services and a set of internal events available to each external component through a plurality of compatible sockets;
   the plurality of compatible sockets comprising a set of socket capabilities, a set of socket services and a set of socket events to enable the set of external components to utilize the set of elements associated with the plurality of component frameworks through a set of compatible interfaces; and
   a plurality of channels to enable communication between the plurality of component frameworks and the set of external components plugged in at operation time, wherein the external component extends and adds functionality to the plurality of component frameworks by:
   invoking a set of capabilities associated with each external component by: (i) allocating the set of resources to each external component (ii) performing a plurality of tasks by each external component, wherein the plurality of tasks comprising a set of pre-defined actions (iii) releasing the set of resources associated with each external component after performing the plurality of tasks; and
   invoking a set of services associated with the set of external components by: (i) allocating the set of resources to the set of external components (ii) performing the plurality of tasks to obtain a set of results, wherein the plurality of tasks comprising a set of pre-defined actions (iii) releasing the set of resources associated with the set of external components (iv) providing the set of results to the host system and (v) utilizing the set of results by the host system.

2. The architecture of claim 1, wherein the plurality of channels to enable communication between the plurality of component frameworks and the set of external components further comprising:
   a plurality of event channels to provide pathways for a plurality of actions, wherein the plurality of actions comprising listening, eventing and dispatching a set of events between the plurality of component frameworks and the set of external components;
   a plurality of configuration channels to provide pathway for modifying a configuration associated with the set of external components; and
   a plurality of data channels to provide pathways for exchanging information between the plurality of component frameworks and the set of external components.

3. The architecture as claimed in claim 1, wherein the host system comprising the plurality of component frameworks and a plurality of run time components associated with the plurality of component frameworks, wherein the plurality of run time components comprising a set of capabilities, a set of services and a set of events to enable binding of at least one of the plurality of component frameworks, the plurality of plugs and the plurality of sockets to an operating system associated with the host system.

4. The architecture of claim 1, wherein the plurality of plugs enables the execution of the set of external components by (i) utilizing a plurality of resources allocated to the set of external components by the plurality of component frameworks and (ii) utilizing the set of compatible interfaces for connecting the set of external components to the plurality of compatible sockets.

5. The architecture of claim 1, wherein the set of plug services comprising plug_service_register, plug_service_un-register, plug_service_enumerate, plug_service_process and plug_service_raise.

6. The architecture of claim 1, wherein the set of plug events associated with each plug comprises plug_event_initiate, plug_event_abort, plug_event_send, plug_event_receive and plug_event_terminate.

7. The architecture of claim 1, wherein the set of compatible interfaces are encoded by the plurality of compatible sockets for connecting the plurality of plugs and to perform type checking to validate the compatibility of the plurality of plugs.

8. The architecture of claim 1, wherein the set of socket services associated with each compatible socket comprising a socket_service_discover, socket_service_identify, socket_service_eventing, socket_service_presentation and socket_service_control.

9. The architecture of claim 1, wherein the set of socket events associated with each compatible socket comprising a socket_event_plug, socket_event_unplug, socket_event_send, socket_event_receive and socket_event_interop.

10. The architecture of claim 1, wherein each service from set of plug services is an encapsulated set of functionalities provided by a plugged external component from the set of external components, wherein each service comprises a set of policies to enable execution of the service.

11. The architecture of claim 1, wherein each capability from the set of capabilities is an encapsulated set of functionalities provided by the plugged component from the set of external components, wherein each capability comprises a set of policies to enable execution of the capability.

12. The architecture of claim 1, wherein each event is an encapsulated set of actions triggered while utilizing the set of resources.

13. A processor implemented method for plug and play associated with a host system, the method comprising:
   identifying, by a one or more hardware processors, a set of characteristics associated with each external component to be plugged from a set of external components, wherein the set of characteristics associated with each external component comprising an identity, an interface, a set of capabilities, a set of services and a configuration;
   connecting, by the one or more hardware processors, each external component to a component framework through a compatible socket by: (i) registering the interface associated with each external component from the set of external components (ii) attaching each component through the interface (iii) registering each external component with a component framework from a plurality of component frameworks (iv) registering the set of capabilities associated with each external component (v) registering the set of services associated with each external component (vi) a allocating the set of resources to each external component and (vii) configuring the set of external components;
   invoking, by the one or more hardware processors, the set of capabilities associated with each external component by: (i) allocating the set of resources to each external component (ii) performing a plurality of tasks by each external component, wherein the plurality of tasks comprising a set of pre-defined actions (iii) releasing the set of resources associated with each external component after performing the plurality of tasks;
   invoking, by the one or more hardware processors, a set of services associated with the set of external components by: (i) allocating the set of resources to the set of external components (ii) performing the plurality of tasks to obtain a set of results, wherein the plurality of tasks comprising a set of pre-defined actions (iii) releasing the set of resources associated with the set of external components (iv) providing the set of results to the host system and (v) utilizing the set of results by the host system; and
   releasing, by the one or more hardware processors, the set of external components by: (i) unplugging each external component from the plurality of component frameworks (ii) unregistering the set of services associated with the set of external components (iii) unregistering the set of capabilities associated with the set of external components (iv) unregistering the configuration associated with the set of external components (v) releasing the set of resources associated with the set of external components (vi) unregistering the set of interfaces associated with the set of external components and (vii) unregistering the set of external components.

14. One or more non-transitory machine readable information storage mediums comprising one or more instructions which when executed by one or more hardware processors causes:
   identifying, by a one or more hardware processors, a set of characteristics associated with each external component to be plugged from a set of external components, wherein the set of characteristics associated with each external component comprising an identity, an interface, a set of capabilities, a set of services and a configuration;

connecting, by the one or more hardware processors, each external component to a component framework through a compatible socket by: (i) registering the interface associated with each external component from the set of external components (ii) attaching each component through the interface (iii) registering each external component with a component framework from a plurality of component frameworks (iv) registering the set of capabilities associated with each external component (v) registering the set of services associated with each external component (vi) allocating the set of resources to each external component and (vii) configuring the set of external components;

invoking, by the one or more hardware processors, the set of capabilities associated with each external component by: (i) allocating a set of resources to each external component (ii) performing a plurality of tasks by each external component, wherein the plurality of tasks comprising a set of pre-defined actions (iii) releasing the set of resources associated with each external component after performing the plurality of tasks;

invoking, by the one or more hardware processors, a set of services associated with the set of external components by: (i) allocating the set of resources to the set of external components (ii) performing the plurality of tasks to obtain a set of results, wherein the plurality of tasks comprising a set of pre-defined actions (iii) releasing the set of resources associated with the set of external components (iv) providing the set of results to the host system and (v) utilizing the set of results by the host system; and releasing, by the one or more hardware processors, the set of external components by: (i) unplugging each external component from the plurality of component frameworks (ii) unregistering the set of services associated with the set of external components (iii) unregistering the set of capabilities associated with the set of external components (iv) unregistering the configuration associated with the set of external components (v) releasing the set of resources associated with the set of external components (vi) unregistering the set of interfaces associated with the set of external components and (vii) unregistering the set of external components.

* * * * *